May 24, 1960

H. T. WILTON 2,937,569

MICRO-FILM PROJECTOR

Filed Sept. 14, 1955

INVENTOR
HENRY T. WILTON
BY Herbert C. Kimball
ATTORNEY

May 24, 1960

H. T. WILTON 2,937,569

MICRO-FILM PROJECTOR

Filed Sept. 14, 1955

INVENTOR
HENRY T. WILTON
BY
Herbert C. Kimball
ATTORNEY

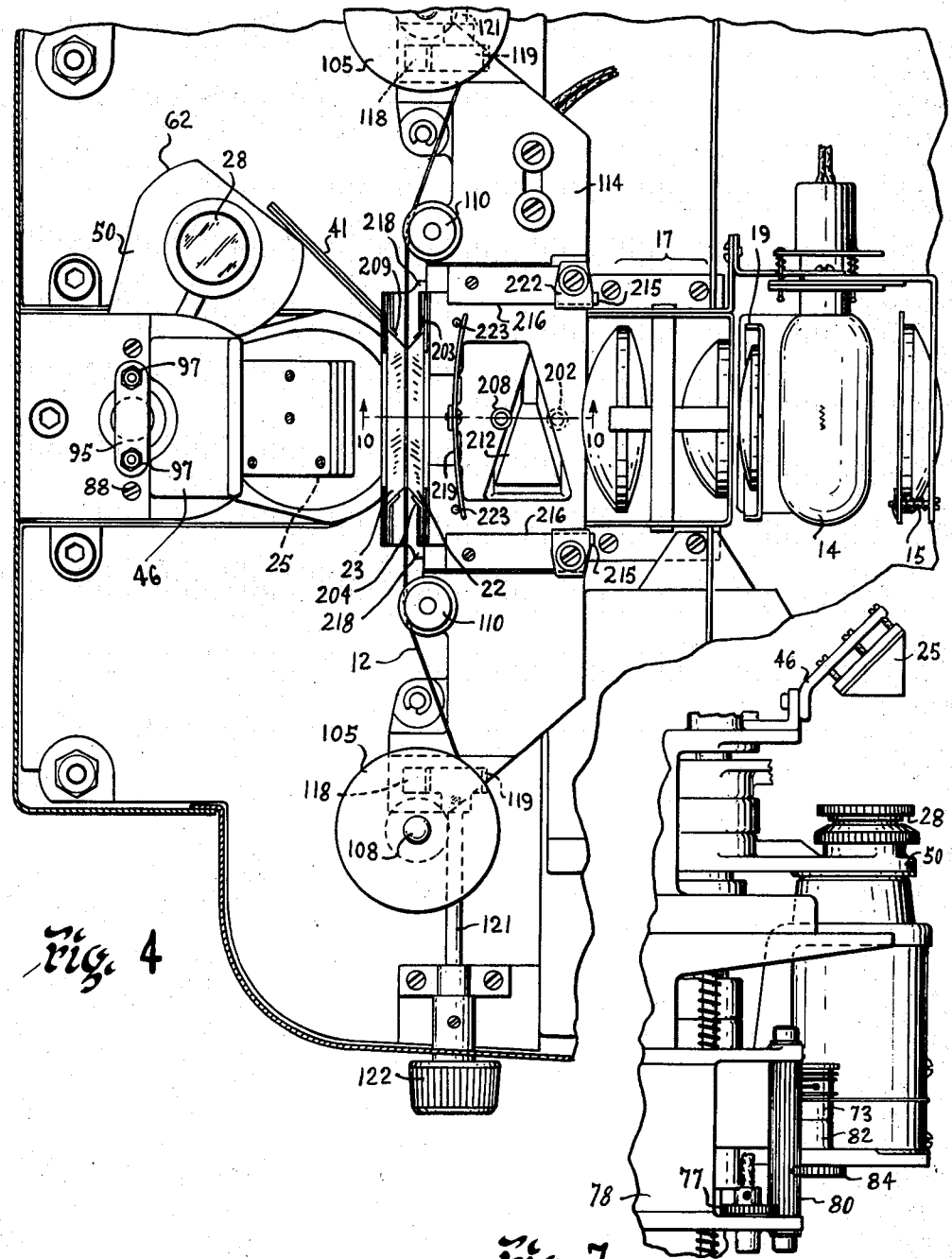

May 24, 1960

H. T. WILTON 2,937,569

MICRO-FILM PROJECTOR

Filed Sept. 14, 1955

INVENTOR
HENRY T. WILTON

BY Herbert C Kimball

ATTORNEY

United States Patent Office 2,937,569
Patented May 24, 1960

2,937,569

MICRO-FILM PROJECTOR

Henry T. Wilton, Buffalo, N.Y., assignor to American Optical Company, Southbridge, Mass., a voluntary association of Massachusetts Filed Sept. 14, 1955, Ser. No. 538,493

5 Claims. (Cl. 88—24)

This invention relates to micro-film readers and similar devices for projecting strip film which is moved across a film gate located in the optical path of a projector.

An object of the present invention is to improve the accuracy of the focusing of the optical system of the projector. It is well known that if the film deviates from the object plane of the system, the crispness of the image on the screen deteriorates; and pressure plates have been widely used for ensuring the proper positioning of the film in the film gate. Such pressure plates do not injuriously affect the surface of the film so long as the film winding proceeds at relatively low speeds. In a companion application filed by Paul Rosenthal, Serial No. 534,260, filed September 14, 1955, an electrical control for opening the pressure plates whenever a predetermined low speed of drive of the film winding mechanism is exceeded, is described and claimed. The present invention provides mountings for the pressure plates which improve the action of the pressure plates in responding to the automatic electrical control of that application on the mechanical controls previously known.

Not all material carried by micro-film needs to be magnified to the same extent. Interchanging objectives may lead to vignetting problems where a Dove or roof prism is employed for orienting a selected figure or view which is positioned for viewing. In accordance with the present invention, instead of spacing the Dove prism at a sufficient distance from the object plane so as to accommodate a selected objective for the desired magnification, the prism is reciprocable along the optical path and automatically brought into snug engagement with the selected objective when the latter is shifted into the optical path.

Not only is it an object of the invention, therefore, to bring about accurate focusing of the optical system, but in those installations where a roof prism is used, vignetting by the latter is avoided even though the prism is of moderate size and accordingly moderate in cost.

A further feature of the present invention is the mounting of the film winding mechanism on its own frame so as to be reciprocable relative to the main frame on which the optical projection system is carried. By so shifting the film winding mechanism and accordingly the strip film itself, the optical path of the projector is caused to pass through a selected portion of the material which would be off-axis if the film winding mechanism were fixedly mounted in the usual fashion.

These and other objects of my invention will become more clearly apparent by a more detailed description which is now given in connection with the accompanying drawings in which:

Fig. 4 is a plan view of the mechanism shown in Fig. 3 together with part of the optical system;

Fig. 7 is a view similar to Fig. 5 showing the optical system arranged for lower magnification;

Figure 2:
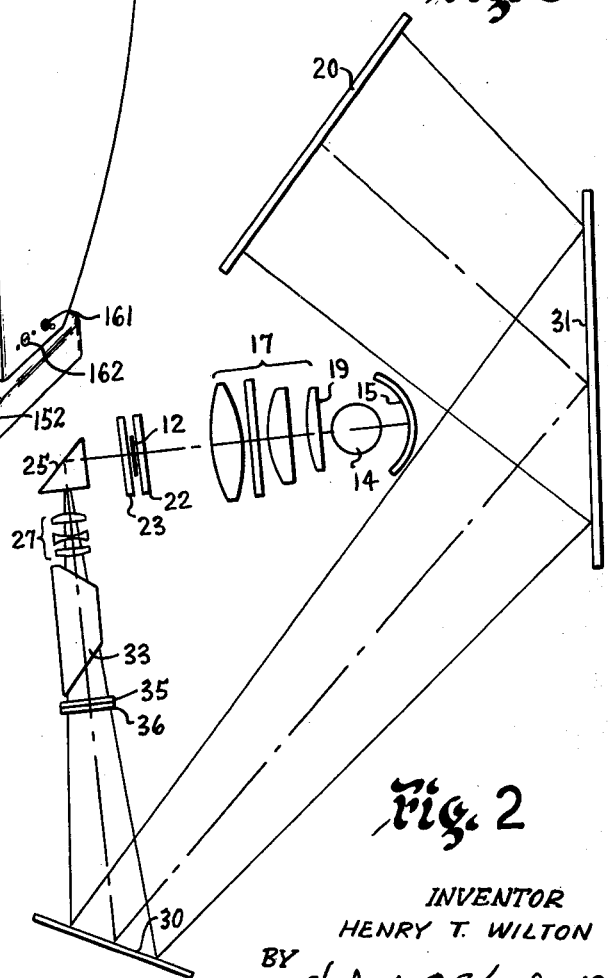
Fig. 2 is a schematic view of the optical system of the projection device.

Referring to the drawings which illustrate a preferred embodiment of my invention, the projection device is housed within a cabinet generally indicated by the numeral 10, with various control knobs and switch levers conveniently arranged for the operation of the projection device. These knobs and levers will be later described in greater detail. Assuming that the strip film 12 may be moved across a film gate located in the optical path of the projection device by film winding mechanism to be later described in connection with Figs. 3 and 4, the optical principles of the projection system will now be described in connection with Fig. 2.

For the sake of compactness, I prefer to use a folded system. As arranged in one such system illustrated in Fig. 2, the light source is a lamp 14 backed by a reflector 15 for emitting a beam of light focused on the strip film 12 by the condenser system generally indicated by the number 17. As it is desirable to impart different magnifications to the material on the film being projected onto the screen 20, the condenser system 17 is provided with an insertable element 19. When element 19 is inserted in the position shown in Fig. 4, the condenser system 17 is operative for cooperating with an objective yielding a higher magnification. When element 19 is retracted to inoperative position by mechanism later to be described, the condenser system 17 will cooperate with a lower power objective.

Figure 9:
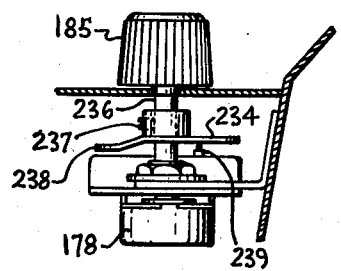
Fig. 9 is a detail view showing common control means for the speed of the driving motor and for the change in separation of the pressure plates.

The portion of the strip film 12 in the film gate is, for purposes of accurate observation, maintained in focus by opposed pressure plates 22 and 23. As above mentioned in connection with Figure 9, the separation of these plates is controlled by the same control which determines the speed of the film winding mechanism. The beam of light, after passing through the strip film, is directed by the prism 25 down through the objective 27 or 28 as the case may be, to a lower mirror 30, thence to a back mirror 31 and so onto the viewing screen 20.

Figure 6:
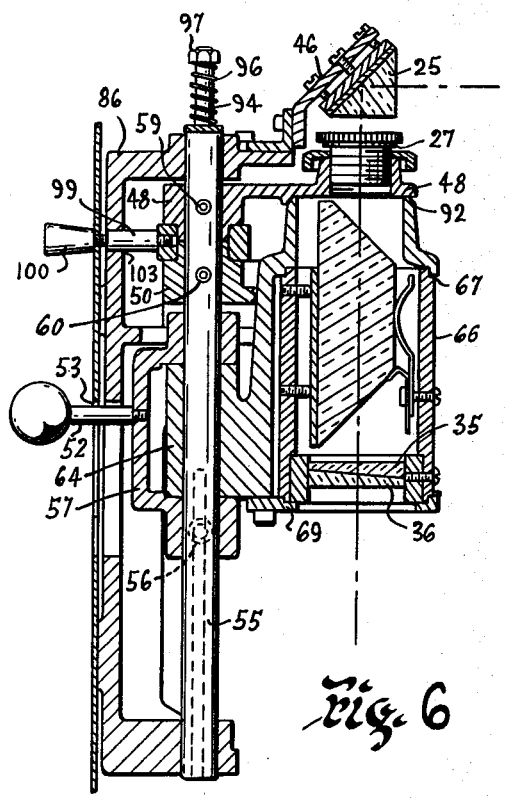
Fig. 6 is a view of this portion of the optical system in section on the optical axis.

The lamp 14 is centrally located, and the emitted beam is directed toward the front of the cabinet 10 with the result that the objective is located at the very front of the cabinet where it may be conveniently shifted by the operator for different magnifications. For high power magnification, a group of lenses 27 forms the objective and this group is located fairly close to the prism 25 as shown in Fig. 6. For lower magnification, a different group of lenses 28 (not seen in Fig. 2) is swung into the optical path at a position more remote from prism 25 as shown in Fig. 7.

The optical path also passes through a so-called Dove prism or roof prism 33 mounted for rotation about the optical path as an axis. This has the well known effect of rotating the image projected on the screen 20. If desired a color corrector wedge consisting of prisms 35 and 36 may be mounted in the optical path adjacent the roof prism 33 to compensate the axial dispersion of the latter.

During scanning, the strip film is moved across the film gate located in the optical path at relatively low speed. If the operator knows that a fairly remote section of the film is wanted, the winding mechanism is driven at high speed until such section is approached, when scanning is resumed. When the desired information or view is located, the winding mechanism is halted, and if desired the orientation of the figure, view or printed material is changed by rotating the prism 33.

Figure 8:
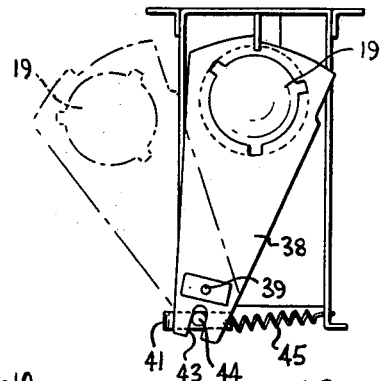
Fig. 8 is a detail view showing in rear elevation an insertable element of the condenser system in both inserted and retracted positions.
Figure 11:
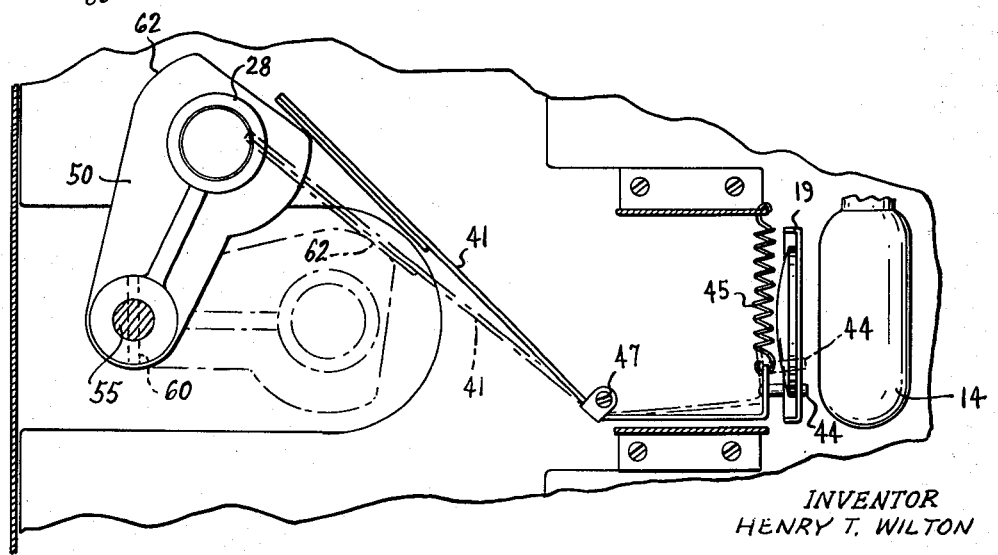
Fig. 11 is a detail view in plan showing the actuating lever for insertion of the additional element of the condenser system.

The operator has a selection of magnifications. The condenser system 17 which cooperates with the low power objective 28 supplies adequate illumination for an image of uniform brightness. When, however, a higher power objective such as 27 is substituted for objective 28, adequate illumination is obtained by inserting the additional element 19 at the back of the condenser system 17. As shown in Fig. 8 the insertable element 19 is carried by a mount 38 pivoted at 39 to swing from the inserted position shown in full lines to the retracted position shown in broken lines. A dog-leg shaped lever 41 (see Fig. 4) is actuated by the swinging into operative position of the objective 28 (later described in more detail) to impart oscillation to the mount 38 through the notch 43 in the lower end of the mount which is engaged by the pin 44 on the lever 41. A spring 45 biases the mount 38 toward retracted position. The lever 41 swings on a pivot 47 adjacent the bend in the lever, so that when the objective 28 is swung into the optical path, the lever 41 (see Fig. 11) moved in a counterclockwise direction to move the pin 44 to the right as viewed in Fig. 8.

Figure 1:
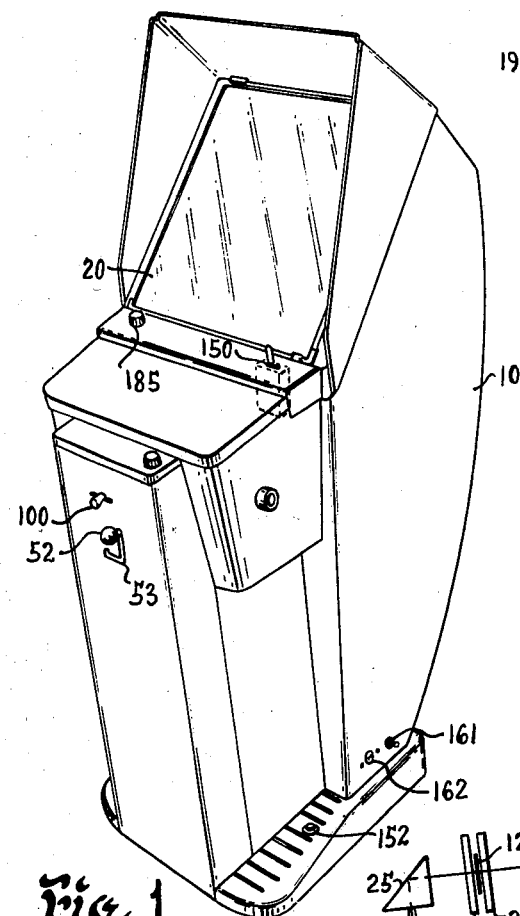
Fig. 1 is a perspective view of a projection device embodying my invention.

The prism 25 is fixed in position by its carrier 46. Below the prism 25, the objectives 27 and 28 are carried by oscillatable mountings 48 and 50 for alternate use in the optical system. A lever 52 projecting through a J shaped slot 53 in the front of the cabinet 10 controls the magnifying power of the optical system. When the lever 52 is in the position shown in Fig. 1 the objective 27 is in the operative position shown in Figs. 5 and 6 for imparting higher magnification. The lever 52 is not fixed to vertical rock shaft 55, but is splined thereto at 56. Accordingly the movement of the lever 52 in the vertical portion of the J slot 53 raises or lowers the yoke 57 to which the lever 52 is fixed, but does not rotate the rock shaft 55. The movement of the lever 52 in the horizontal portion of the J slot rocks the shaft 55. At the end of such a movement to the left as viewed in Fig. 1 there is a slight rise in the slot 53 which permits a corresponding rise in yoke 57. Mountings 48 and 50 are fixed by pins at 59 and 60 respectively to the rock shaft 55.

The rock shaft 55 and the mountings 48 and 50 constitute a turret mounting for objectives 27 and 28 which can be turned by lever 52 about an axis parallel to the optical path (see Fig. 2) to introduce a selected objective into that path. Thus objective 27 may be oscillated out of the optical path and objective 28 into the optical path by moving the lever 52 from right to left in the horizontal portion of the slot 53 (see Fig. 1). A movement of the lever 52 in the opposite direction on the horizontal portion of slot 53 returns objective 27 to operative position.

As above mentioned, it is desirable, when using the higher power objective such as 27, to modify the illumination by inserting element 19 as an added element of the condenser system 17. This is accomplished through a lever which by-passes the film gate so as to interconnect the objective mounting and element 19. As will be apparent from Fig. 11 a portion 62 of mounting 50 acts as a cam surface. This surface rides against the adjacent end of lever 41 to cam the insertable element 19 (Fig. 8) to operative position, and spring 45 moves element 19 to retracted position when mounting 50 is swung to the position shown in Fig. 7.

The same lever 52 which interchanges the objectives 27 and 28 brings about the automatic positioning of the Dove prism 33 so as to cooperate with the selected objective. The improved arrangement for accomplishing this has the advantages which has been mentioned above without requiring manipulation of the prism by a separate control. In order to accomodate both objectives 27 and 28, the prism must be reciprocable along the optical axis; yet the prism must be rotatable about that axis for its intended purpose. A mounting 64 is provided for the Dove prism 33 which is not fixed to the rock shaft 55 but is slidable along that shaft whose axis is parallel to the optical path. The mounting 64 is raised and lowered on shaft 55 as yoke 57, which embraces it, is raised and lowered during movement of lever 52 in the vertical portion of slot 53.

Prism 33 is adjustably positioned in a rotatable cylindrical housing 66. This housing rotates relative to a bearing 67 in the mounting 64, and is retained against this bearing by a ring 69. The wedges 35 and 36 are likewise retained in position on the housing 66 by the ring 69.

A belt or cord 71 passed about the cylindrical housing 66 and also about a hub 73 brings about rotation of the prism 33 when the hub 73 is driven. The drive for the hub 73 originates with a knob 75 (see Figs. 1 and 5) at the front of the cabinet 10. Through a flexible drive shaft 76 the knob 75 rotates a spur gear 77 which is carried by a stationary bracket 78. The spur gear 77 meshes with an elongated vertically arranged spline gear 80 which is carried by the same bracket 78. The hub 73 is rotatably mounted in a bearing 82 in the ring plate 69 carried on the mounting 64 for the prism 33. Beneath the bearing 82, an extension of the hub 73 carries a spur gear 84 which meshes with spline gear 80 to complete the drive from knob 75 to housing 66, no matter what the position of mounting 64 may be on shaft 55. Accordingly the orientation of prism 33 is under the control of knob 75 at all times.

Figure 5:
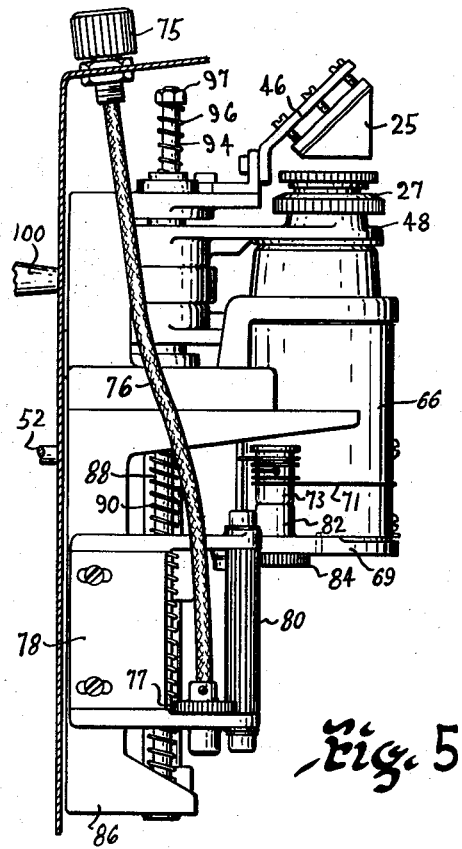
Fig. 5 is a view in side elevation of the portion of the optical system (including the objective) at the front of the cabinet.

The rock shaft 55 is vertically slidable (and also rotatable) in a portion 86 of the frame 116 of the projection device, the bracket 78 being supported on this same portion. Two vertical rods of which only one, 88, is shown in Fig. 5 are supported by the portion 86. As indicated in Fig. 4, there is one of these vertical rods to either side of rock shaft 55. A perforated ear (not shown) on the side of the mounting 64 rides up and down on each of these vertical rods so as to maintain the mounting 64 against swinging movement about shaft 55. At the same time a spring 90 on each rod 88 urges the ears and with them the mounting 64 upwardly. When the lever 52 is pushed downwardly in slot 53 the springs 90 are compressed. When the lever 52 is released at either end of the slot 53, the springs 90 raise the mounting 64 so that its upper rim 92 is pushed up into snug inter-engagement with the mounting 48 or 50 as the case may be. Accordingly the lever 52 acts as common actuating means for the turret mounting of the objectives and the reciprocation of the prism 33 to accommodate the new objective when there is an interchange for the purpose of changing the magnification. Whenever a different objective is introduced, the prism 33 is automatically brought into operative relation therewith, the rim 92 snugly inter-engaging with the mounting of the respective objective and assisting in maintaining axial alignment.

A pair of studs 94 fixed in the frame portion 86 mount springs 96 so as to bear at one end on nuts 97 and at the other end on a strip 95 (see Figs. 4 and 5). The upper end of shaft 55 is pushed upwardly against the strap 95 by the action of the pair of springs 90. A stud 99 with operating handle 100 extends from a ring 102 through a cam slot 103 in frame portion 86. The ring 102, which surrounds shaft 55 is assembled as a rotatable sleeve confined between mountings 48 and 50 when the mountings are pinned to the shaft 55. When the stud 99 is moved by handle 100 (see Fig. 1), the shaft 55 is moved slightly up or down as the case may be to bring the material projected onto screen 20 into better focus. The objectives 27 and 28 when originally inserted in their mountings are par-focalized, but differences in film may introduce slight differences in the object plane.

Figure 3:
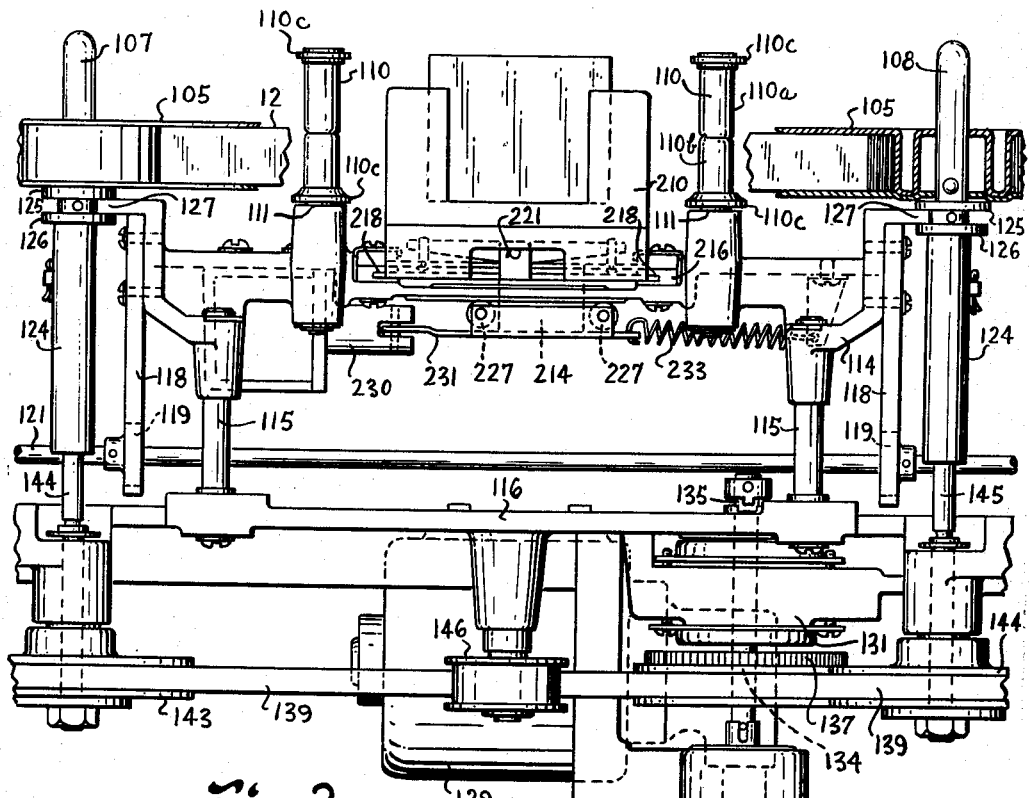
Fig. 3 is a front elevational view of the film winding mechanism, and showing the pressure plates in the film gate.

The film winding mechanism shown more particularly in Figs. 3 and 4 accommodates more than one width of strip film. The particular reels 105 shown in Fig. 3 on th spindles 107 and 108 carry film 12 which in width is one-half the capacity of the guide rollers 110. Wider film up to the capacity of guide rollers 110 can be accommodated. The latter are of improved design to permit projection of different widths of film, in that the rollers are each divided into two sections 110a and 110b carried by a spindle 111. The upper section 110a may be removed from the spindle 111 and turned upside down so that its flange 110c is adjacent the section 110b and in guiding relation to the narrower width of film.

The spindles 107, 108 and 111 are rotatably carried by an elevator frame 114 which slides vertically on posts 115 fixed in the main support 116 of the projection device on which the various parts of the optical system are carried. The elevator frame 114 carries a rack 118 at each end, meshing with a pinion 119. Each pinion 119 is fixed to a shaft 121 which carries an operating knob 122 on the end thereof which projects outside the cabinet 10. As the elevator frame is thus raised or lowered, the film winding mechanism but not its drive is raised or lowered relative to the optical path with the result that the operator may seek out a particular portion of the film 12 and center it with respect to the optical path (see Fig. 2) and accordingly the screen 20.

The lower end of each reel spindle 107 or 108 extended as a cylindrical sleeve 124 having parallel flanges 125 and 126 at its upper end portion. As each sleeve 124 rotates during driving of film winding mechanism, it is prevented from rising or falling relative to the elevator frame 114 by a rider 127 fixed to the frame 114 which engages in the groove between flanges 125 and 126.

The driving mechanism is carried by the main frame or support 116, and includes an electric motor 129 and gear transmission 131 together with solenoid 132 controlled clutches 134 and 135 for connecting the motor 129 alternatively in driving relation either directly (clutch 134) for high speed or through clutch 135 and the gear transmission 131 for lower speeds. The final gear 137 of the gear transmission has secured to it a drive pulley (not shown) through which the V belt 139 is driven. When clutch 134 is engaged, shaft 141 which is a motor driven shaft is directly connected to gear 137 and drives belt 139 through the drive pulley secured to it. When clutch 134 is disengaged (by relaxation of solenoid 132), clutch 135 is engaged, and drive shaft 141 transmits power through the gear transmission 131 ending in gear 137.

Pulley 143 is on the lower end of a shaft 144 journaled in the main frame 116 and splined within sleeve 124 of spindle 107. Pulley 144 similarly is on the lower end of a shaft 145 splined within the sleeve extension of spindle 108. A third pulley 146 is an adjustable idler for wrapping the V belt about as much of the circumference of pulleys 143 and 144 as possible and for taking up slack in the belt. Due to the spline connection, drive of either sleeve 124 as the case may be continues no matter where pinions 119 engage racks 118. When pulley 143 is driven to wind film on the reel on spindle 107, a pawl and ratchet (not shown) permits pulley 144 to rotate relative to shaft 145, and vice versa.

A five position switch 150 determines whether the motor shall run (a) at high speed in one direction— switch at extreme left; (b) at low speed in that same direction—switch in intermediate left position; (c) stop—switch in middle or neutral position; (d) at low speed in opposite direction—switch in intermediate right position; or (e) at high speed in opposite direction— switch in extreme right position. It is often convenient to use the hands for writing or other purposes, and so a foot switch 160 (which may be plugged in at 162 at Fig. 1) is provided for stopping the motor (at low speed only) to permit reading a selected portion of the projected material. A toggle switch 161 may be closed if the foot switch is not to be used.

When switch 150 is moved to either low speed position (b) or (d) the current supplied to the motor is modified so as to cause low speed drive of the motor. The electrical control for low speed drive may be in the form shown in U.S. patent to Beitz 2,610,540, dated September 16, 1952, the U.S. patent to Critoph 2,615,- 148, dated September 16, 1952, or in the above referred to companion application of Paul Rosenthal Serial No. 534,260. Such an electrical control includes a manually variable device for changing the potential between the current source and the grid of a thermionic power transmitting tube so as to control the time during its half wave cycle when the grid will become positive relative to the cathode of the tube. The resistance forming part of such phase-shifting means is shown at 178 in Fig. 9 and is manually controlled by knob 185. Thus knob 185 controls the portion of each positive half cycle during which current is supplied by the thermionic power tube to motor 129. If current is supplied during a larger portion of each positive half cycle the speed of the film winding mechanism is increased, and vice versa.

Thus far the slow speed drive of the film winding mechanism, either to the right or to the left, has been described. The switch 150 passes through the "stop" position before the direction of drive is reversed. When the switch 150 is moved past intermediate position in either direction, high speed drive of the motor by alternating current is obtained. The blades or contacts of switch 150 are so arranged that alternating current is directly supplied to motor 129 before power is supplied to solenoid 132 to directly clutch the drive shaft 141 to gear 137 for high speed transmission.

Figure 10:
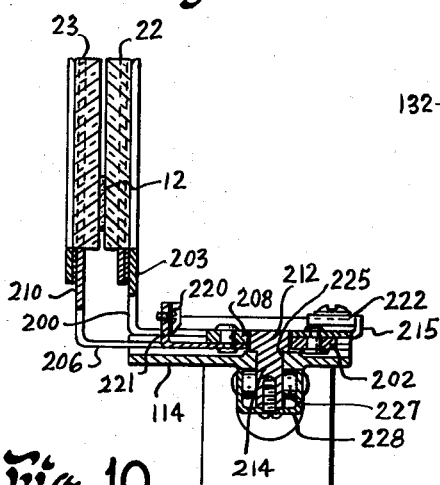
Fig. 10 is a sectional view through the pressure plates on the line 10—10 in Fig. 4.

At low speed the knob 185 acts also to control the opening and closing of pressure plates 22 and 23. As seen in Figs. 4 and 10 pressure plate 22 is carried in offset relation by a carrier or slide 200 carrying a roller 202. The vertical framework 203 of slide 200 grips the pressure plate by means of fingers 204. Beneath the slide 200 is a slide 206 carrying a roller 208. Fingers 209 on the vertical framework 210 of carrier 206 grip the pressure plate 23. A separator in the form of a wedge 212 mounted on a carriage 214 cooperates with rollers 202 and 208 to move the carriers 200 and 206 and bring the pressure plates 22 and 23 closer together or separate them. The slides 200 and 206 are in guides 216 and are lightly biased toward closed position by leaf spring 219 secured midway by a screw 220 to an upstanding post 221 on slide 206. The free ends of leaf spring 219 bear against a pair of pins 223 on slide 200. Therefore, as carriage 214 moves parallel to the direction of travel of film strip 12, the pressure plates 22 and 23 are opened or closed depending on the direction in which carriage 214 moves. Stops 215 are provided on carriers 200 and stops 218 are provided on carrier 206 so that a minimum space is provided for film strip 12. Stops 218 engage ends of the guides 216, while stops 215 engage adjustable abutments 222 whereby the minimum space between the pressure plates may be adjusted. Accordingly there is no binding on the film strip as the same is moved through the film gate for scanning. Should a splice or other oversize portion reach the film gate, the pressure plates readily open due to their oppositely tapered edges to pass the oversize portion. The pressure of leaf spring 219 is light enough to permit this.

Referring to Fig. 10 it will be noted that carriage 214 carrying wedge 212 has a rib which projects downwardly through a slot 225 in the elevator frame 114. Rollers 227 mounted on a U-shaped member 228 are secured to this rib so as to engage the lower side of the frame 114 and guide the travel of the carriage 214. Such travel is controlled electrically from the same manual control means 185 which controls the phase shift with relation to the thermionic power tube and accordingly controls the current supply for low speed drive of motor 129.

A solenoid 230 (see Fig. 3) has a connecting link 231 to the portion of carriage 214 which projects below slot 225. A spring 233 tends to draw the carriage 214 to the right (in Fig. 3) and solenoid 230, when actuated, draws the carriage 214 and with it wedge 212 to the left, separating the pressure plates 22 and 23.

The control means 185 (see Fig. 9) have an annular contact member 234, whose orientation about the shaft 236 of knob 185 may be adjusted through set screw 237. A deflected portion 238 of member 234 acts to depress a plunger 239 to make and break an electrical circuit at 235 through lead 240 to actuate solenoid 230. By adjustment of member 234 about the shaft of control means 185, the solenoid can be made to pull the carriage 214 and separate the pressure plates 22 and 23 at just the point in the slow speed range of the film winding mechanism that the operator desires. If the operator can read or decipher material as it passes, up to a certain speed, but is not reading at higher speeds, the member 234 is set to depress plunger 239 just above the specified speed as controlled by control means 185.

The mechanism described is particularly advantageous in a projection device for magnifying strip film. In order to decipher what is projected, the film winding mechanism should have a slow yet a steady drive which will permit movement of the film for scanning. During scanning the positioning of the film in accurate position by the opposed pressure plates 22 and 23 leads to accurate focus on the screen 20. Yet a release of the pressure plates is automatically effected if the speed of the film winding mechanism is raised above a given point. This is accomplished by the common control of the speed of drive of the film winding mechanism and of the release of the pressure plates.

It is believed that a clear understanding of the invention will be had from the foregoing description. The mechanism and optical system are both compactly arranged to give maximum brightness of image in a cabinet of minimum dimensions. Even when changing to the higher power magnification, the illumination is adequate due to the automatic insertion of the additional element 19 in the condenser system directing the beam of light through the film gate.

The interchange of objectives is readily obtained because the folded optical system is so arranged that the turret mounting for the objectives is at the front of the cabinet under the convenient control of the reader.

A further convenience to the reader, the Dove prism for orienting a figure or chart for ease in reading, is kept at moderate cost because a minimum size of prism is usable in the arrangement which I have devised. In this arrangement the prism is automatically moved along the axis of the optical system and into snug interfitting relation with the objective selected for introduction into the optical system. A minimum size of Dove prism may be used when its operative position is as close as this to the objective.

A further advantage to the reader is the ability to shift the frame on which the film winding mechanism is carried. In this way a different portion of the film held by the pressure plates in the film gate may be centered with the optical axis of the projector. This is of particular importance at high magnifications where some of the material in the film gate may fall outside the confines of the screen 20.

The use of pressure plates is well known and it has been proposed that they be released with increase in speed of the film winding mechanism. The mounting of the pressure plates on slides or carriers in accordance with my invention so that a separator moving parallel to the path of the strip film may change their separation is of distinct advantage in accomplishing the desired purpose.

It is obvious that the improvements stated are not dependent upon the exact details of the particular embodiment illustrated except as required by the accompanying claims.

I claim:

1. In a projection device for strip film the combination of a film gate, film winding means for moving strip film across said gate, and an optical system for projecting the portion of the film in said gate including a plurality of objectives, a turret mounting said objectives for introduction of a selected objective into the optical path, a roof prism for orienting the projected image about the axis of the optical system and a mounting for said prism arranged to rotate said prism about the said optical axis and to reciprocate said prism along said axis into and out of operative relation with the selected objective without rendering the rotation of said prism inoperative, the said reciprocation permitting a different objective to be introduced by said turret into the optical path.

2. In a projection device for strip film, the combination of a film gate, film winding means for moving strip film across said gate, and an optical system for projecting the portion of the film in said gate including an objective, a mounting for moving said objective into and out of the optical path, a roof prism for orienting the projected image about the axis of the optical system and a mounting for said prism, said prism mounting when in operative relation engaging said objective mounting and maintaining optical alignment and arranged to move said prism along the optical path into and out of operative relation with said objective and to rotate said prism about said path in different positions to which it is moved along said path.

3. In a projection device for strip film the combination of a film gate, film winding means for moving strip film across said gate, and an optical system for projecting the portion of the film in said gate including a plurality of objectives, a turret mounting said objectives for introduction of a selected objective into the optical path, a roof prism, a mounting for said prism arranged to move said prism along the optical path into and out of operative relation with the selected objective and to rotate said prism about said path, and common actuating means for the turret and the longitudinal movement of the mounting for the roof prism, said actuating means automatically effecting movement of said mounting along the optical path in conjunction with the introduction of a different objective into the optical path.

4. In a projection device for strip film the combination of a film gate, film winding means for moving strip film across said gate and an optical system for projecting the portion of the film in said gate comprising a turret rotatable about an axis parallel to the optical path of said optical system, a plurality of objectives carried by said turret, a condensing system having an insertable auxiliary lens element, said element being movable to operative position in the condensing system and to a position retracted from the system, and means actuated by turning of said turret for inserting and retracting the insertable element of said condensing system.

5. In a projection device for strip film the combination of a film gate, film winding means for moving strip film across said gate, an optical system for projecting the portion of the film in said gate including a plurality of objectives, a mounting for said objectives movable to different positions for introducing a selected objective into the optical path of said system, a condensing system for directing light through said gate to the objective in the optical path, said condensing system having an insertable auxiliary lens element movable to operative position in the condensing system and to a position retracted from the system, and an actuating lever by-passing said gate and connecting said insertable element and the objective mounting for automatically shifting said insertable element in response to interchange of said objectives.

References Cited in the file of this patent

UNITED STATES PATENTS

| | | |
|---|---|---|
| 2,037,705 | Chapman | Apr. 21, 1936 |
| 2,110,484 | Hopkins | Mar. 8, 1938 |
| 2,280,750 | Emerson | Apr. 21, 1942 |
| 2,313,639 | Hauser | Mar. 9, 1943 |
| 2,377,476 | Berglund | June 5, 1945 |
| 2,404,189 | Place | July 16, 1946 |
| 2,481,850 | Lindner | Sept. 13, 1949 |
| 2,606,477 | Leslie | Aug. 12, 1952 |
| 2,610,540 | Beitz | Sept. 16, 1952 |
| 2,692,529 | Halahan | Oct. 26, 1954 |